L. SCHISSEL.
TIRE TREAD.
APPLICATION FILED FEB. 26, 1919.

1,324,695. Patented Dec. 9, 1919.

WITNESSES

INVENTOR
LOUIS SCHISSEL
BY
ATTORNEYS

UNITED STATES PATENT OFFICE.

LOUIS SCHISSEL, OF BROOKLYN, NEW YORK.

TIRE-TREAD.

1,324,695.   Specification of Letters Patent.   Patented Dec. 9, 1919.

Application filed February 26, 1919. Serial No. 279,246.

*To all whom it may concern:*

Be it known that I, LOUIS SCHISSEL, a citizen of the United States, and a resident of the city of New York, borough of Brooklyn, in the county of Kings and State of New York, have invented a new and Improved Tire-Tread, of which the following is a full, clear, and exact description.

The present invention relates to tires and has for an object to provide an improved detachable tire tread which may be applied to a tire to extend the life thereof.

For the purpose of description reference will be made to the accompanying drawings forming a part hereof, in which—

In the construction shown, the retread comprises sections 1, which overlap and are adjustably connected. To these sections are secured resilient tread members 2, which in use provide the wear-resisting elements and are preferably made of resilient material, such as india rubber, or of fiber composed in part of india rubber.

Figure 1:
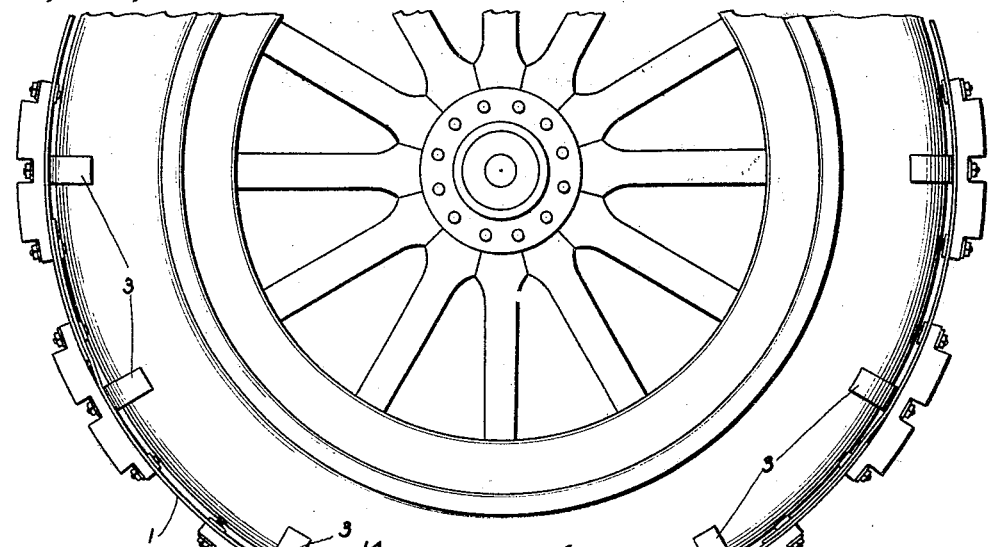
Figure 1 is a view of a wheel and tire showing a tire tread embodying the invention applied thereto.
Figure 2:
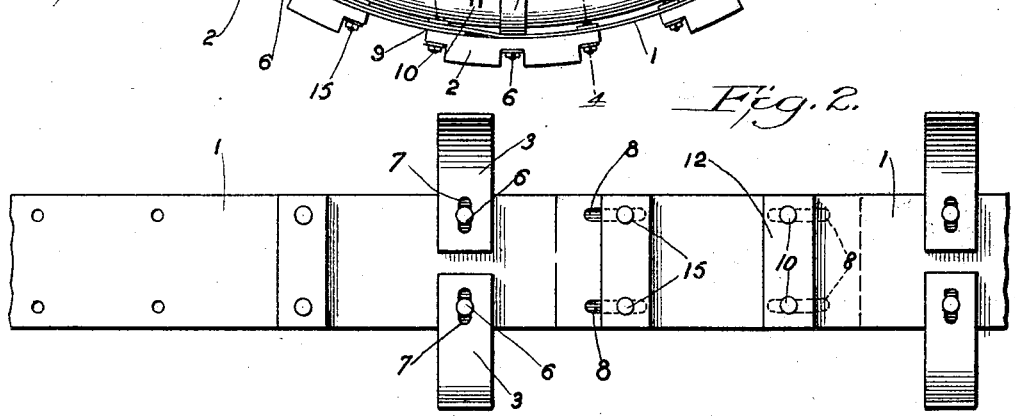
Fig. 2 is an inside plan view of a portion of the detachable tread shown removed from th tire.
Figure 3:
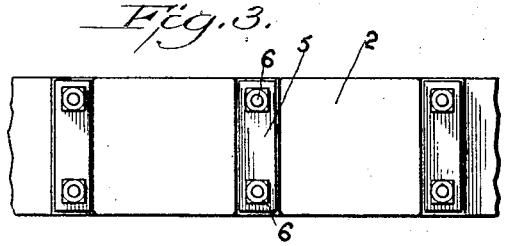
Fig. 3 is an outside plan view of the resilient member of the tire tread.

In order to prevent movement of the retread laterally of the tire and to hold it securely in position upon the tire, lateral guides 3, are secured to the tread sections or strips 1. Preferably these sections are adjustably secured in order that the retread may be applied to tires of different sizes. As shown, one pair of guides is provided beneath the center of each resilient tread member 2. A bar washer 5 is positioned in a transverse groove across the center of the tread member 2 and a pair of guides 3, is positioned directly therebeneath and on the inside of the metal strip 1. Bolts 6, extend through the bar washers 5, through holes in the metal strips 1, and through slots 7, in the transverse side guides 3, the guides being laterally adjustable in said slots and being held in adjusted position by the binding of the bolts 6. The tread sections 1, overlap and are slotted at their ends as indicated at 8. As shown in Figs. 1 and 2, one end of each strip lies between the next adjoining strip and the end of a resilient tread member attached thereto, as indicated at 9 in Fig. 1.

Bolts 10, extend through the end of the tread section, through slots 8, in the end of the adjoining metal strip, through holes in the inner metal strip, and through washer plates 11 and 12 positioned respectively on the outside of the resilient tread section and on the inside of the metal strip. These bolts when tightened secure the tread section in place and secure the overlapping ends of the middle strips 1, in overlapped and adjusted position. The corresponding free end 14 of one of the strips lies within the adjoining strip opposite the end of the tread section. Bolts 15, extend through the several parts and through slots 8, to hold the parts in overlapped adjusted position.

Figure 4:
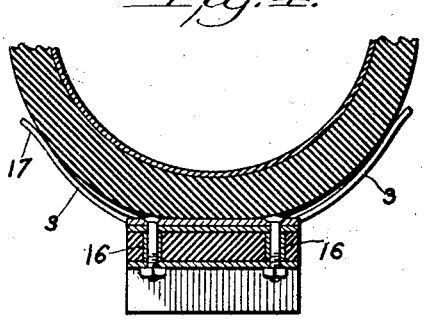
Fig. 4 is a cross section shown on the line 4—4 of Fig. 1.

The resilient tread sections are preferably provided with sleeves 16, through which which the securing bolts extend, as indicated in Fig. 4. These sleeves protect the resilient tread member and serve also as spacing members. The outer ends of the lateral guide members 3, are preferably flared outwardly, as indicated at 17 in Fig. 4, in order to present a smooth surface against the tire to which the device is applied.

It will be understood that modifications may be made without departing from the scope of the invention as set forth in the claims appended hereto.

Having thus described my invention, I claim as new and desire to secure by Letters Patent:

1. A tire tread, comprising in combination; a plurality of adjustably connected strips overlapping one upon the other, tread retaining brackets carried upon the tread retaining strips and adjustable transversely of said strip, traction lugs secured to the adjustable strips and to the retaining brackets.

2. A protective tread for pneumatic tires, comprising in combination; a plurality of overlapping tread strips with slotted openings provided in each end thereof, bolts passed through the slots, traction lugs fixed upon the tread strips by connecting with the bolts which pass through the overlapping sections, tread retaining brackets comprising arcuate members with slots formed therein adjustably carried by the tread strips.

LOUIS SCHISSEL.